United States Patent [19]
Shanahan

[11] Patent Number: 5,454,528
[45] Date of Patent: Oct. 3, 1995

[54] TAPE CASSETTE

[76] Inventor: Daniel J. Shanahan, 1019 Ivy Wall, Houston, Tex. 77079

[21] Appl. No.: 185,110

[22] Filed: Jan. 18, 1994

[51] Int. Cl.[6] .................................................. G11B 23/087
[52] U.S. Cl. ................................................................ 242/343
[58] Field of Search ............................... 242/343, 343.1, 242/343.2; 360/132

[56] References Cited

U.S. PATENT DOCUMENTS

| | | | |
|---|---|---|---|
| 4,466,584 | 8/1984 | Chevalier et al. | |
| 4,554,443 | 11/1985 | Lambert et al. | |
| 4,586,101 | 4/1986 | Vogelgesang | |
| 4,802,048 | 1/1989 | Perkins et al. | 242/343 |
| 4,842,217 | 6/1989 | Vinson | |
| 5,005,099 | 4/1991 | Perryman et al. | 360/132 |
| 5,023,741 | 6/1991 | Conti et al. | 360/132 |
| 5,091,813 | 2/1992 | Ryu | |
| 5,109,314 | 4/1992 | Wright | |
| 5,228,637 | 7/1993 | Granzotto | 242/343 |
| 5,305,171 | 4/1994 | Wolfson | 242/343 |
| 5,351,909 | 10/1994 | Moore | 242/343 |

*Primary Examiner*—John P. Darling
*Attorney, Agent, or Firm*—Pravel, Hewitt, Kimball & Krieger

[57] ABSTRACT

An improved tape cassette which prohibits the advancement of the tape in a fast forward speed or advance searching mode through its lead portion includes at least a pair of extendable members which pivot or swing outwardly in the event the take-up spool is advanced above a predetermined rate of rotation. However, after a predetermined amount of tape has unwound off of the storage spool, the extendable members are prohibited from pivoting or extending outwardly further. Thereafter, the operator is permitted to fast forward the tape through the remaining portion. In this manner, the lead portion of the tape can only be viewed in a normal play mode and cannot be fast forwarded or advanced through quickly by the operator.

15 Claims, 3 Drawing Sheets

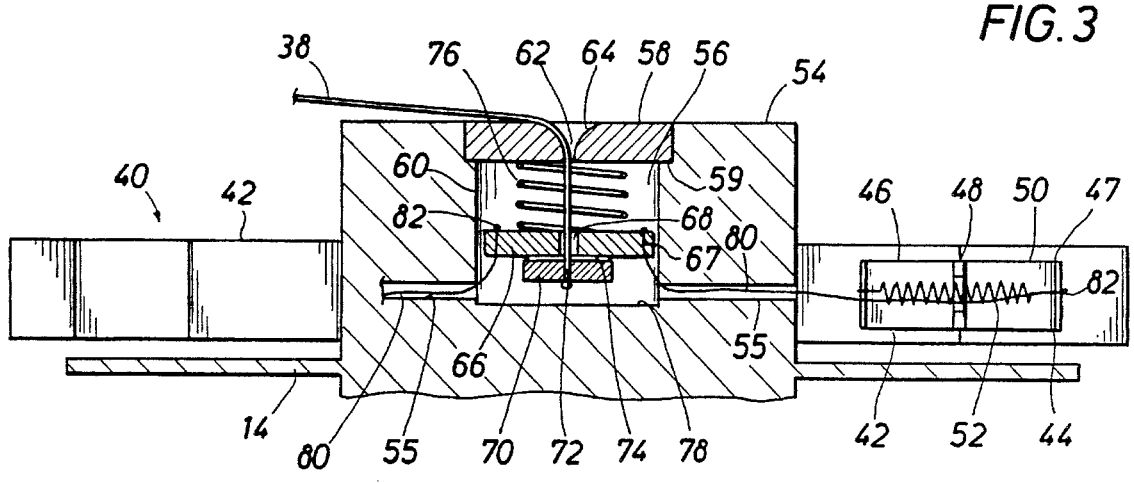
FIG. 3
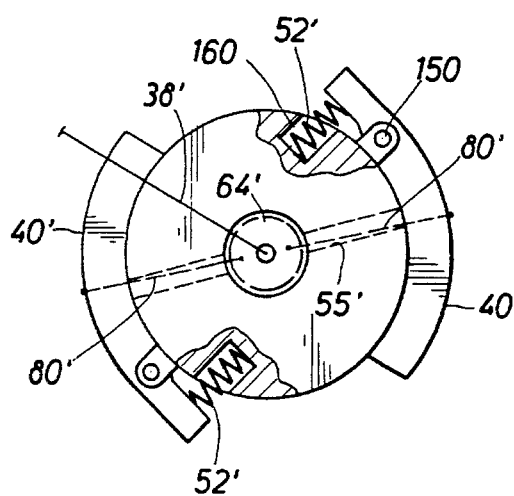
FIG. 4A
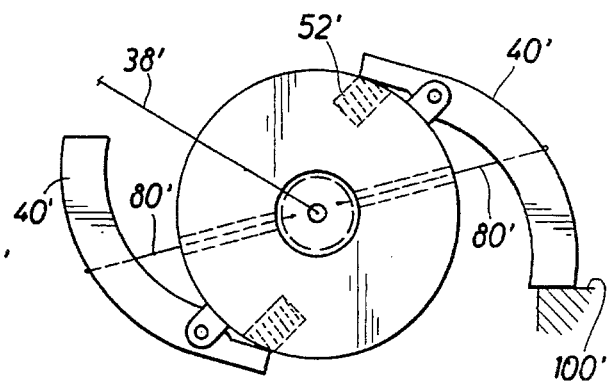
FIG. 4B
FIG. 5A
FIG. 5B

TAPE CASSETTE

SPECIFICATION

1. Field of the Invention

This invention relates to an improved tape cassette which prohibits the advancement of the tape at its lead end above a predetermined rate of rotation for a few minutes. More particularly, this invention relates to an improved video tape cassette which prohibits the user from fast forwarding or advance searching through the lead portion of the tape for about three to about ten minutes of normal play time.

2. Background of the Invention

Recently, it has become more popular for cassette manufacturers and vendors to include commercials at the lead portion of a tape, particularly a video tape. This is particularly true in the case of video tapes which are available for rental. The vendors of such rental tapes have found a marketing potential in the advertisement of other movies and products at the beginning portion or lead of rental movies. However, it has been the tendency of many viewers or operators to fast forward through these commercial portions or advance the tape in a search mode to the beginning of the movie.

Therefore, there is a need in the advertising industry for a mechanism to prohibit the operator from fast forwarding the tape through the lead portion of a tape thereby requiring the operator to advance the tape in only a play mode through the commercial lead. But any such mechanism must be capable of disengagement at some point so that the operator may then fast forward through the movie or other portions of the tape.

Applicant is not aware of any prior art which suggests an improved tape cassette design precluding the operator from fast forwarding or rotating the spools of tape above a predetermined rate of rotation for a limited period.

SUMMARY OF THE INVENTION

Briefly, the invention relates to an improved tape cassette, specifically a video tape cassette, which includes a tape storage spool for storing the tape and a tape take-up spool. The improvement includes means for prohibiting the rotation of the tape take-up spool at a rate greater than a predetermined rate of rotation and then means for disengaging that prohibiting means after a predetermined amount of tape has been wound off of the tape storage spool, permitting the rotation of the tape take-up spool at a rate greater than the predetermined rate of rotation. Preferably, the prohibiting means includes extendable members intended to swing outwardly if the operator attempts to fast forward the tape take-up spool, but after a predetermined amount of tape has unwound off of the tape storage spool, the operator can fast forward the tape. In this manner, the operator is precluded from fast forwarding or executing a search mode during the lead portion of the tape when commercials or other advertisements or materials are included. However, after a predetermined amount of tape has been unwound off of the tape storage spool, the operator is then permitted to fast forward or perform a search mode through the remaining portions of the tape which would include the movie or audio music or other media recorded on the tape.

Examples of the more important features of this invention have been summarized rather broadly in order that the detailed description may be better understood. There are, of course, additional features of the invention which will be described hereinafter and which will also form the subject of the claims appended hereto.

BRIEF DESCRIPTION OF THE DRAWINGS

FIG. 3 is a partial sectional view taken along line 3—3 of FIG. 1.

FIGS. 4A and 4B illustrate an alternate embodiment of a portion of the present invention.

FIGS. 5a and 5b illustrate yet another alternate embodiment of a portion of the present invention.

DETAILED DESCRIPTION OF THE INVENTION

Figure 1:
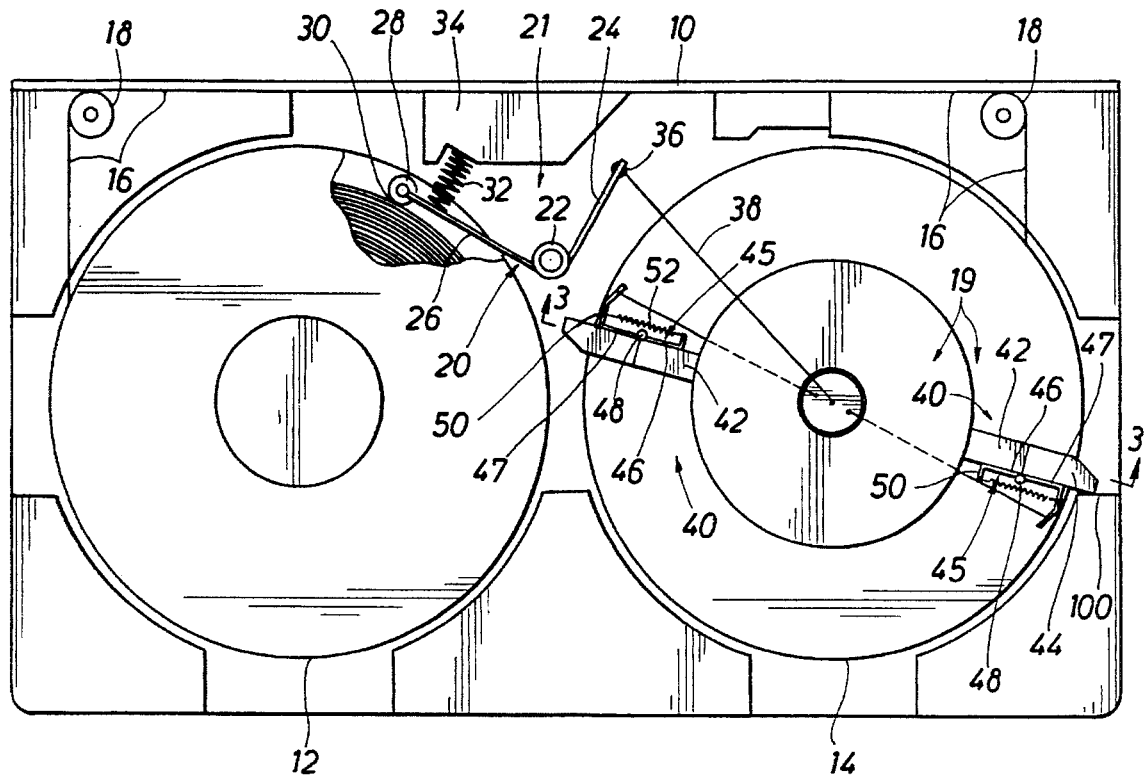
FIG. 1 is a plan view of a cassette illustrating the present invention in a locked mode.
Figure 2:
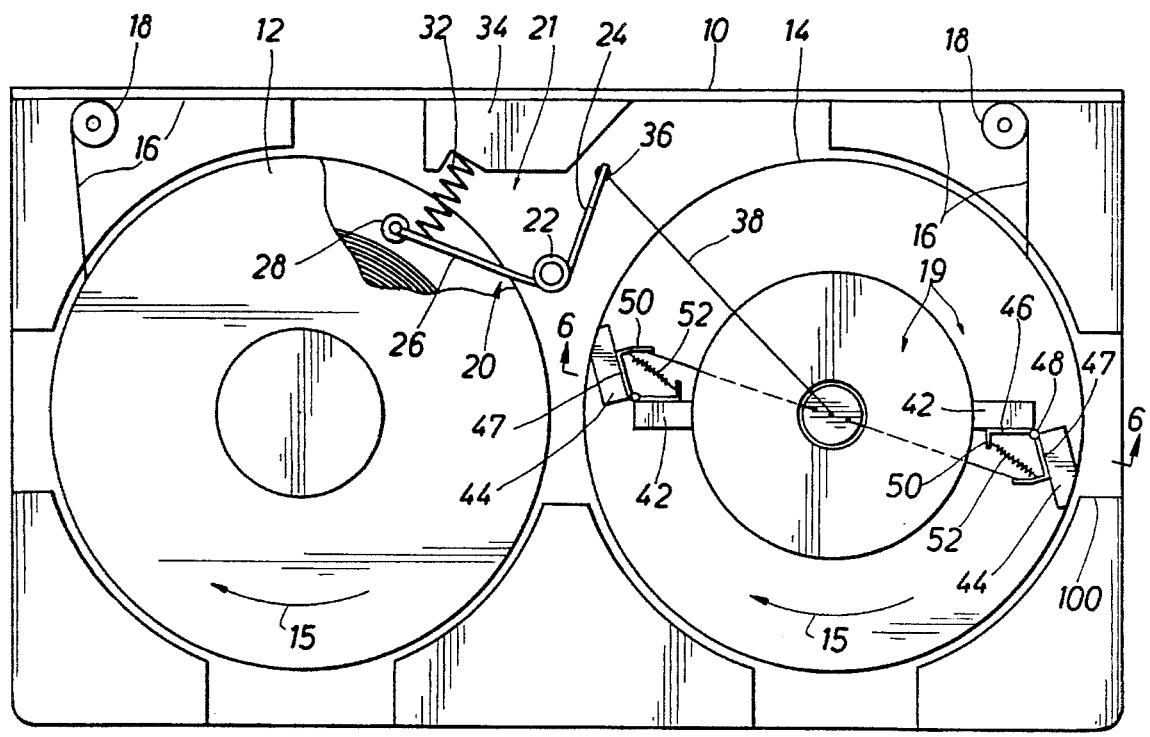
FIG. 2 is also a plan view of cassette illustrating the present invention in a disengaged mode.

Referring to FIGS. 1 and 2, a tape cassette 10, preferably a video cassette, is shown with the top portion or cover of the cassette holder removed. Located within the tape cassette 10 is a tape storage spool 12 and a tape take-up spool 14. In a normal play mode, the tape storage spool and the take-up spool rotate in the direction of arrows 15. In normal play the tape 16 unwinds off of storage spool 12, wraps around rollers 18 and rewinds on tape take-up spool 14.

Referring specifically to FIG. 1, the cassette is shown fully rewound with spool 12 storing all the tape. In this mode, any commercial lead portion or other advertisement would be the first item to play. The present invention comprises a system 19 to prohibit the rotation of the take-up spool above a predetermined rate of rotation and a system 21 to disengage the prohibiting system 19 after a predetermined amount of tape has been wound off of tape storage spool 12 onto take-up spool 14.

The disengaging system 21 includes a pivotal member 20 which pivots about a pin 22. The pivotal member 20 includes a first leg 24 and a second leg 26. The second leg 26 includes a roller 28 which is engagable with that portion of tape 16 (numeral 30) still wound on spool 12. The roller 28 is held in an engaged or contacting position with tape portion 30 by means of a spring 32. Spring 32 is normally in a compressed mode as shown in FIG. 1 with one end restrained by leg 26 of member 20 and the other end restrained against portion 34 of cassette 10. The first leg 24 of member 20 includes an aperture 36 at one end through which a wire 38 is secured. Wire 38 continues to the center of spool 14 as shown in FIG. 3.

Figure 7:
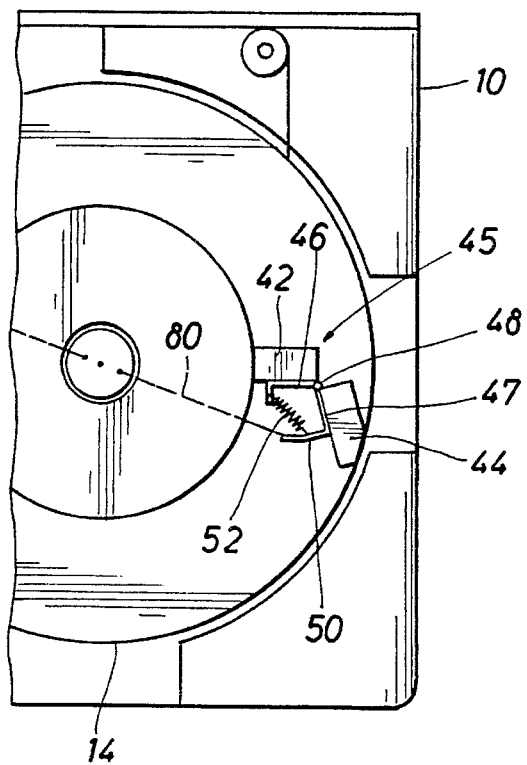
FIG. 7 is a detail view of a portion of the present invention in a normal play mode at the beginning or lead portion of a tape.

Referring now to FIGS. 1 and 7, the prohibiting system 19 preferably includes a pair of extendable members 40. In the preferred embodiment, each extendable member 40 is composed of two arms 42 and 44 which are connected by a pivoted hinge connection 45. The hinge 45 includes a center pivot joint 48 and sides 46 and 47. Side 46 also includes a bracket 50. Side 46 is attached to arm 42 and side 47 is attached to arm 44. A tension spring 52 stretches between outer ends of sides 46 and 47. In a normal operating play mode, the tension on spring 52 is such as to pivot arm 44 about arm 42 along pin 48 as shown in FIG. 7. However, if the operator attempts to fast forward the lead portion of the tape, the arms 44 extend outwardly and stop the rotation of spool 14 as discussed in more detail below.

Referring now to FIG. 3, attached to the top portion of take-up spool 14 is a center body 54. The center portion of body 54 includes an open region 56. A guide plate 58 is supported at the top of region 56 along shoulders 59 of wall 60. Guide plate 58 includes a central aperture 62 with an inner curved surface 64 on which wire 38 rests and passes through aperture 62 of plate 58. A second plate 66 is supported within region 56 and includes an aperture 68 through which wire 38 passes. A swivel disc 70 is located below second plate 66 and includes an aperture 72 through which wire 38 passes. The end of wire 38 is secured by a knot or other means on the opposite side of aperture 72 prohibiting wire 38 from passing back through aperture 72. A nylon bushing or other washer 74 is placed between plate 66 and swivel bushing 70 to permit relative rotation so that bushing 70 and wire 38 may remain stationary as spool 14 rotates. In this manner wire 38 will not be twisted.

A spring 76 is placed in compression between guide plate 58 and second plate 66. As described below, the length of wire 38 is selected so as to support swivel bushing 70 off of floor 78 of region 56 and maintain spring 76 in compression. The plate 66 includes apertures 67 through which a pair of wires 80 pass. Wires 80 are attached at opposite ends of plate 66 by a knot 82 or other means, such as a solder or a locking collar. Body 54 includes two apertures 55 through which each wire 80 passes. Each arm 42 is secured to body 54, and each wire 80 exits body 54 through aperture 55 and continues to bracket 50 where it is secured at its other end 82. FIG. 3 shows arms 44 in a locked position (FIG. 1). Thus, wires 80 are loose as shown in FIG. 3 so that the arms 44 may swing outwardly and lock (as described in more detail below) without interference from wires 80.

Referring now to the operation of the present invention, in a normal play mode, extendable members 40 are retracted as shown in FIG. 7. This is possible because spring 52 pivots arm 44 about arm 42 at hinge point 48. However, if the operator should decide to advance the tape in a fast forward mode or a fast searching mode above a predetermined rate of rotation, generally more than about 3.5 inches per second, the centrifugal force exerted on arm 44 as a result of the fast forwarding rotation overcomes the compressive force of spring 52, stretching spring 52 and rotating the arms 44 about joint 48 as shown in FIG. 1. As a result, one arm 44 strikes edge 100 of cassette 10 (or other fixed impediment) prohibiting the further rotation of spool 14. Thus, the operator may not fast forward through the lead portion. In order to commence operation again, the operator rewinds the tape briefly to disengage arm 44 off of edge 100. At that point, the operator may continue to view the tape but only in a normal play mode or below a predetermined rate of rotation so as not to create enough centrifugal force against arm 44 to overcome the compressive strength of spring 52.

After a predetermined amount of tape has unwound off of spool 12, the present invention provides for the disengagement of the prohibiting system 19. Normally, a vendor or other advertiser would like to ensure about 10 minutes of time at the lead portion of a video or audio tape for commercial advertisements. With a normal VHS system, this amounts to approximately 1000 inches of tape at the lead portion or approximately ⅛ to ¼ inch of tape as measured along the radius of storage spool 12 (see location of roller 28 on FIG. 2 in comparison to roller 28 on FIG. 1). After this amount of tape has unwound, spring 32, which is in a compressed mode, pivots member 20 about pin 22 in a counter-clockwise direction. This in turn moves point 36 of first leg 24 to the left as shown in FIG. 2 stretching wire 38.

Figure 6:
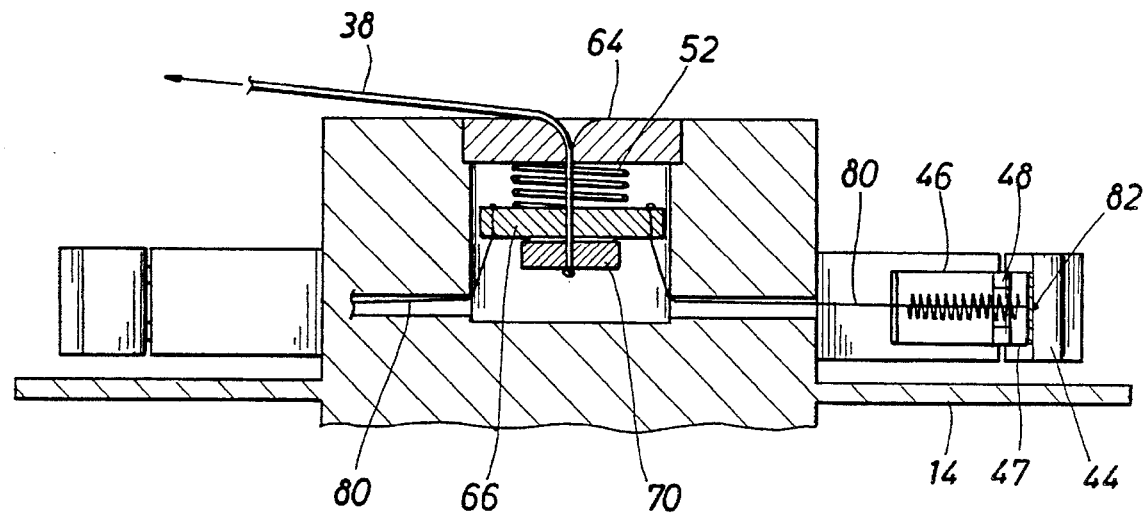
FIG. 6 is a partial sectional view taken along line 6—6 of FIG. 2.

Referring now to FIG. 6 also, advancement of wire 38 as shown in FIG. 2 raises plate 66 and swivel bushing 70 thereby compressing spring 76 further. Such upward advancement of plate 66 in turn pulls on wires 80 which thereby pull brackets 50 inwardly and rotates arms 44 about joint 48 as shown in FIG. 2.

Thus, after a predetermined amount of tape, typically about 1000 inches, has been wound onto take-up spool 14 (which should provide enough lead time for commercials or other advertisements) member 20 has rotated counter-clockwise, pulling wire 38 which pulls wires 80 by raising plate 66, and thereby rotates arms 44 about joint 48. At that point, the operator may fast forward the tape through the remaining portion without locking spool 14. When the operator wishes to rewind the tape on spool 12, he/she may do so without concern since arm 44 will not lock in a reverse direction as tape is rewound onto storage spool 12.

Referring now to FIGS. 4A and 4B, an alternate embodiment of the extendable arms is shown. Extendable members 40' are made of a single piece and pivotally connected at 150 by a pin connection. Spring 52' is a compression spring and is restrained within a bore 160 of center body 54'. Wire 38' passes through guide plate 64' and connects with a swivel bushing and second guide plate as shown in FIG. 3. Similarly, wires 80' are attached at opposite sides of a guide plate 66 (as shown in FIG. 3), pass through apertures 55' of body 54' and are attached at their other end to extendable members 40'. The operation of the invention is the same. In a normal play mode, the compressive force of spring 52 is sufficient to overcome any centrifugal force exerted on members 40'. However, if the operator should decide to fast forward, members 40' would overcome the compression force of spring 52' and extend outwardly as shown in FIG. 4B. Wires 80' are loose enough to permit the rotation of members 40' without being restrained. When that happens, one end of member 40' strikes edge 100', or other impediment, stopping the further rotation of spool 14. To disengage the spool 14, the operator would briefly rewind the tape permitting the retraction of members 40' back to their original position as shown in FIG. 4A. Otherwise, the operation of the present invention with the embodiment shown in FIGS. 4A and 4B is identical to the preferred embodiment discussed above.

Referring now to FIGS. 5A and 5B, yet another alternate embodiment of the extendable member is shown. In this embodiment, extendable members 40" telescope inwardly and outwardly relative to center body 54". Again, extendable member 40" is of a single unitary construction. It includes a flanged portion 140 against which spring 52" rests. Extendable member 40" is supported within a cavity 200. Spring 52" is compressed against one end of flange 140 and at its other end against end wall 210 of cavity 200. Wire 38" passes through guide plate 64", identical to that shown in FIG. 3. Wires 80" pass through apertures 55" of body 54", through a portion of each member 40" and are secured at their other end 82".

In a normal operating mode, (that is, when the tape is being wound onto take-up spool 14 below a predetermined rate of rotation), spring 52" overcomes the centrifugal force associated with the mass of member 40". In the event the operator tries to fast forward the tape, the centrifugal force extend on members 40" overcomes the compressive force of spring 52", permitting the members 40" to extend outwardly radially because wires 80" have enough slack not to restrain their outward movement. This permits the outer edge of member 40" to strike edge 100", or other fixed impediment, prohibiting the further rotation of spool 14. Once again, if the operator wishes to retract the extendable member 40" to permit continued viewing, the tape is briefly rewound to remove the member 40" from edge 100" thereby permitting the retraction of member 40". Otherwise, the operation of the present invention with respect to the embodiment shown in FIGS. 5A and 5B is identical to that discussed above with respect to the preferred embodiment.

The operator may rewind the tape upon completion without concern since the embodiment shown in FIGS. 4A and 4B would not impede the advancement of take-up spool 14 in a counter-clockwise direction. Similarly, as end portions 300 of members 40" in FIGS. 5A and 5B are beveled, spool 14 may be rotated in a counter-clockwise direction. The foregoing invention has been described in terms of various embodiments. Modifications and alterations to these embodiments will be apparent to those skilled in the art in view of this disclosure. It is, therefore, to cover all such equivalent modifications and variations which fall within the spirit and scope of the claimed invention.

What is claimed is:

1. In a tape cassette of the type including a tape storage spool with tape and a tape take-up spool, the improvement comprising:

means for prohibiting the rotation of the tape take-up spool at a rate greater than a predetermined rate of rotation, said prohibiting means including:

at least one extendable member attached at one end to the tape take-up spool, and means for restraining the extendable member in a non-extendable position when the tape take-up spool rotates at a rate below said predetermined rate of rotation and permits the extension of said extendable member when the tape take-up spool rotates at a rate equal to or greater than said predetermined rate of rotation, and;

means for disengaging said prohibiting means after a predetermined amount of tape has been wound off of the tape storage spool permitting the rotation of the tape take-up spool at a rate equal to or greater than said predetermined rate of rotation.

2. The tape cassette according to claim 1 wherein said disengaging means comprises:

a pivotable member having one end engagable with the tape on said tape storage spool; and means for connecting said pivotable member to said prohibiting means.

3. The tape cassette according to claim 2 wherein said connecting means comprises:

a first wire;

means for accommodating slack in said wire wherein said accommodating means comprises a displacable disc supported by the tape take-up spool, said first wire being attached at one end to said pivotal member and at its other end to said displacable disc; and a second wire attached at one end to said displacable disc and at its other end to said extendable member so that pivotal movement of said pivotable member tightens said first wire, elevating said displacable disc so as to tighten said second wire and retract said extendable member.

4. The tape cassette according to claim 1 wherein said tape cassette is a video cassette.

5. The tape cassette according to claim 1 wherein said tape cassette is an audio cassette.

6. An improved video tape cassette comprising:

an outer casing;

a tape storage spool mounted within said outer casing and adapted to store tape;

a tape take-up spool mounted within said outer casing adjacent said tape storage spool;

means for prohibiting the rotation of said tape take-up spool at a rate greater than a predetermined rate of rotation, said prohibiting means including:

at least one extendable member attached at one end to said tape take-up spool, and means for restraining said extendable member in a non-extendable position when said tape take-up spool rotates at a rate below said predetermined rate of rotation; and means for disengaging said prohibiting means after a predetermined amount of tape has been wound off of said tape storage spool permitting the rotation of said tape take-up spool at a rate equal to or greater than said predetermined rate of rotation.

7. The tape cassette according to claim 6 wherein said disengaging means comprises:

a pivotable member having one end engagable with the tape on said tape storage spool; and means for connecting said pivotable member to said prohibiting means.

8. The tape cassette according to claim 7 wherein said connecting means comprises:

a first wire;

means for accommodating slack in said wire wherein said accommodating means comprises a displacable disc supported by said tape take-up spool, said first wire being attached at one end to said pivotal member and at its other end to said displacable disc; and a second wire attached at one end to said displacable disc and at its other end to said extendable member so that pivotal movement of said pivotable member tightens said first wire, elevating said displacable disc so as to tighten said second wire and retract said extendable member.

9. The tape cassette according to claim 6 wherein said tape cassette is a video cassette.

10. The tape cassette according to claim 6 wherein said tape cassette is an audio cassette.

11. In a tape cassette of the type including a tape storage spool with tape and a tape take-up spool, the improvement comprising:

an extendable member attached at one end to said tape take-up spool and adapted to vary between a non-extendable position when the tape take-up spool rotates at a rate below a predetermined rate of rotation and an extendable position when the tape take-up spool rotates at a rate equal to or greater than said predetermined rate of rotation so as to prohibit the rotation of the tape take-up spool; and means for retracting said extendable member after a predetermined amount of tape has been wound off of the tape storage spool prohibiting said member from extending to said extendable position and permitting the rotation of the tape take-up spool at a rate equal to or greater than said predetermined rate of rotation.

12. The tape cassette according to claim 11 wherein said retracting means comprises:

a pivotable member having one end engageable with the tape on the tape storage spool; and means for connecting said pivotable member to said extendable member.

13. The tape cassette according to claim 12 wherein said connecting means comprises:

a first wire;

means for accommodating slack in said wire wherein said accommodating means comprises a displaceable disc supported by the tape take-up spool, said first wire being attached at one end to said pivotal member and at its other end to said displaceable disc; and a second wire attached at one end to said displaceable disc and at its other end to said extendable member so that pivotal movement of said pivotable member tightens said first wire, elevating said displaceable disc so as to tighten said second wire and retract said extendable member.

14. The tape cassette according to claim 11 wherein said tape cassette is a video cassette.

15. The tape cassette according to claim 11 wherein said tape cassette is an audio cassette.

* * * * *